Figure 1:
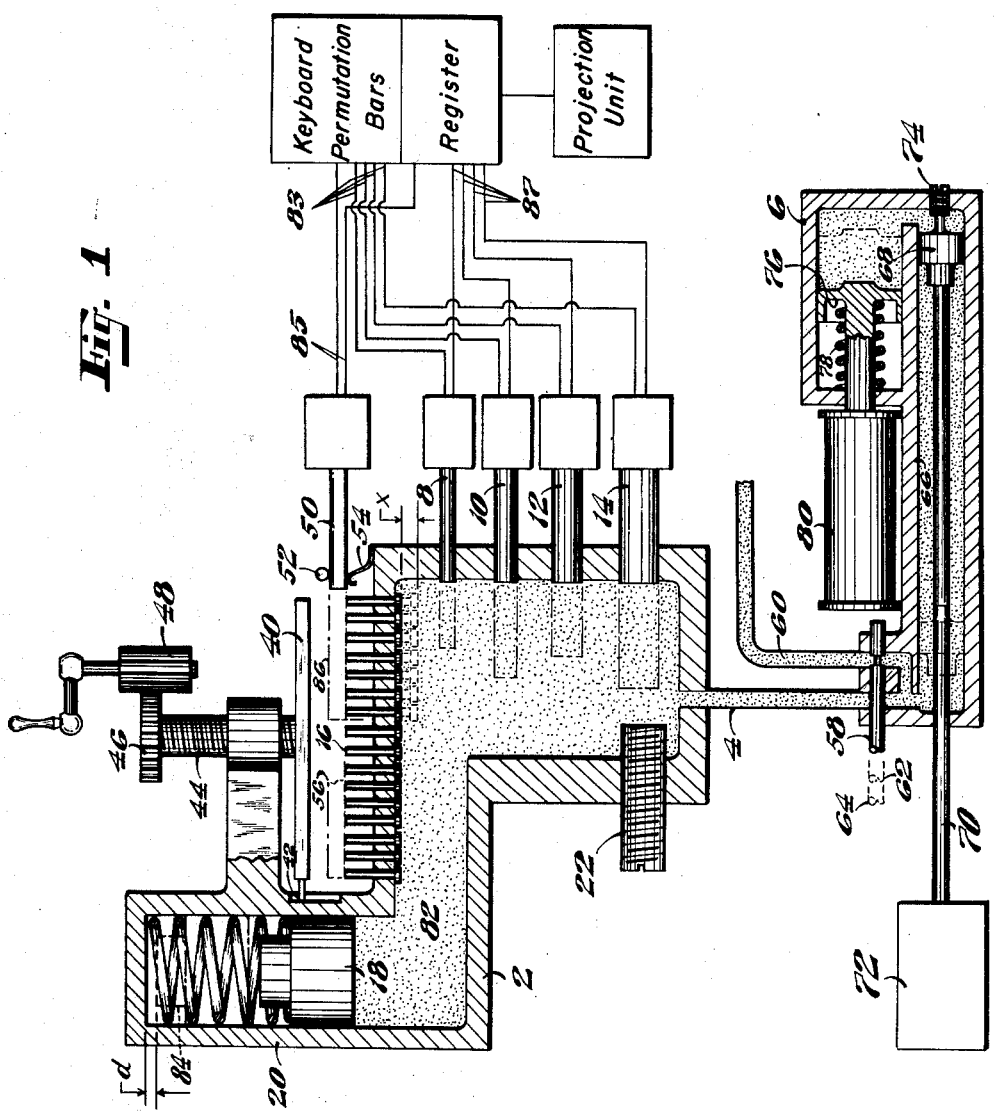

Jan. 18, 1955    S. H. CALDWELL ET AL    2,699,859
APPARATUS FOR COMPOSING JUSTIFIED LINES
Filed Jan. 24, 1950    6 Sheets-Sheet 3

# United States Patent Office 2,699,859
Patented Jan. 18, 1955

2,699,859

APPARATUS FOR COMPOSING JUSTIFIED LINES

Samuel H. Caldwell, René Higonnet, and Louis Moyroud, Cambridge, Mass., assignors to Graphic Arts Research Foundation, Inc., Cambridge, Mass., a corporation of Delaware Application January 24, 1950, Serial No. 140,208

Claims priority, application France January 29, 1949

32 Claims. (Cl. 197—84)

The present invention relates to apparatus for composing justified lines, and more particularly to a justifying device capable of dividing the distance by which the length of an unjustified line must be increased into increments of the desired number and size to be inserted between the words and characters to form the justified line.

"Unjustified line length," as hereinafter used, means the sum of the widths of the characters in the line, plus minimum word intervals, also herein called "word spaces" or "interwords." "Justified line length" is the desired length of the lines. The "line deficit" is the difference between unjustified and justified line lengths. "Justification" is the process of dividing the line deficit into increments to be added to each interword or between characters. The term "point set" refers to the distance requirements between successive characters in a word. "Point size" refers to the character dimensions. These two quantities usually increase and decrease together; but versatility in a composing machine should permit variability where condensed or extended type, as well as normal type, is desired.

Conventional linotype and monotype composing machines are characterized in respect to justification by means enabling the line deficit to be exactly divided among the several increments. For instance, interword increments are all of equal size in any given line, and all lines are theoretically of exactly justified line length.

In the copending application of Higonnet and Moyroud, Serial No. 70,472, filed January 12, 1949, a second type of justification apparatus is described wherein the resultant lines are all of exactly justified line length, but all interword increments are not of equal size in any given line. In that device, the line deficit is divided by the number of interwords, and the integral part of the quotient thus computed is used for only a part of the interwords, a larger increment being employed for the remaining interwords in order that the sum of the increments will exactly equal the line deficit.

A third type of justification apparatus is described in a patent to Hunter, No. 1,732,049, wherein the length units by which the character widths and line deficit are measured are taken small enough to cause the integral value of the quotient, computed as above, to approximate closely the exact quotient. Each interword is then given this quotient increment. The result of this method, however, is to produce lines which are not of exactly justified line length in most cases. Also, complex circuits are a necessary result of the choice of units in that a large number of possible quotients results, and these must be individually provided for by representative electrical contacts.

An object of the present invention is to provide an automatic justifying mechanism capable of making every line of exactly justified line length.

Another object is to provide an automatic justifying mechanism which makes all interword increments in a line of exactly or substantially equal size.

Another object is to provide an automatic justifying mechanism with adjustable means for varying the justified line length.

Another object is to provide justifying apparatus adaptable to changes in point set at any point within a line.

Other objects will be better understood and appreciated from the following description of the invention.

With the above objects in view one of the principal features of the present invention comprises a displacement accumulator having provision for accumulating successive displacements by amounts which correspond to the widths of the characters in a line, and for measuring the further amount of displacement necessary to achieve a predetermined aggregate therein corresponding to the length of a justified line, and means for subtracting successive amounts from the accumulator to bring about the spacing of the characters in the justified line. By this means, the accumulated displacement varies from an initial, or zero, value or amount, to a maximum value or amount, and eventually back to the initial value or amount in a complete cycle whereby the justification of a line is effected.

Preferably, the accumulator is a chamber filled with a liquid. This liquid is displaced by successive amounts as the characters and interwords in a line are selected. After the last character is selected, the further volume of liquid necessary to bring the aggregate displacement to a predetermined amount is measured. The liquid is then replaced by the predetermined amount, thereby causing the justification of the line of selected characters.

Other features of the invention comprise certain features of construction and modes of operation hereinafter described and particularly defined in the claims.

Figure 2:
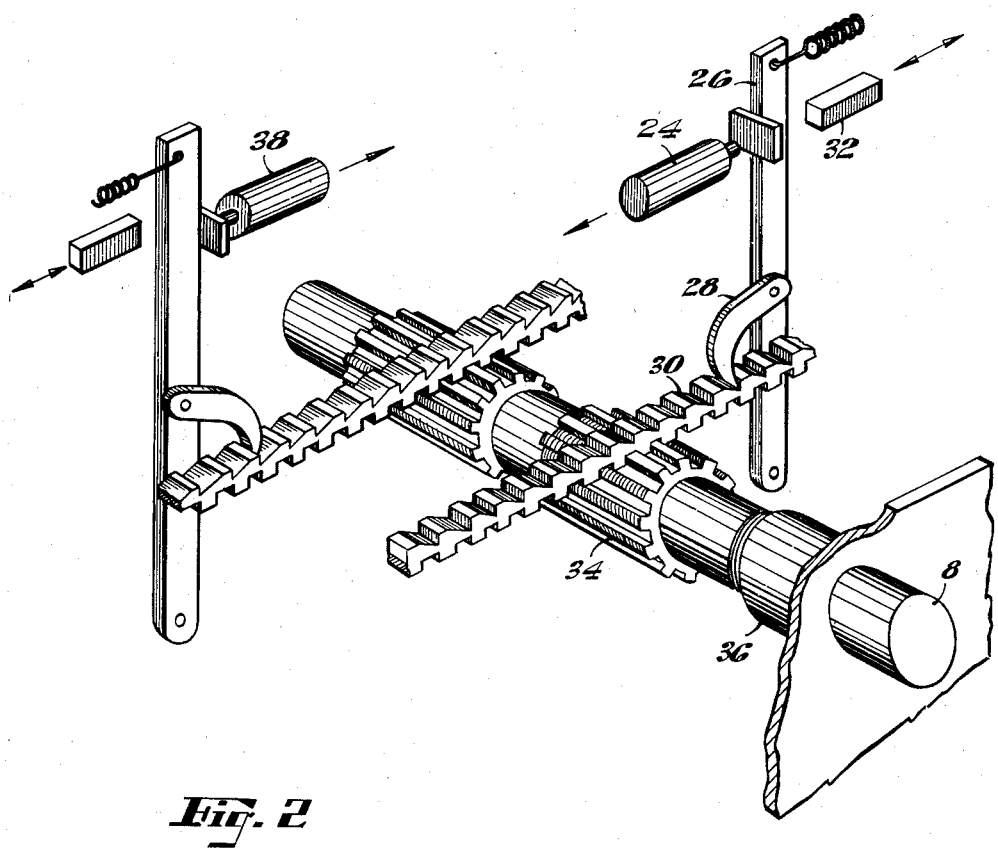
Figure 3:
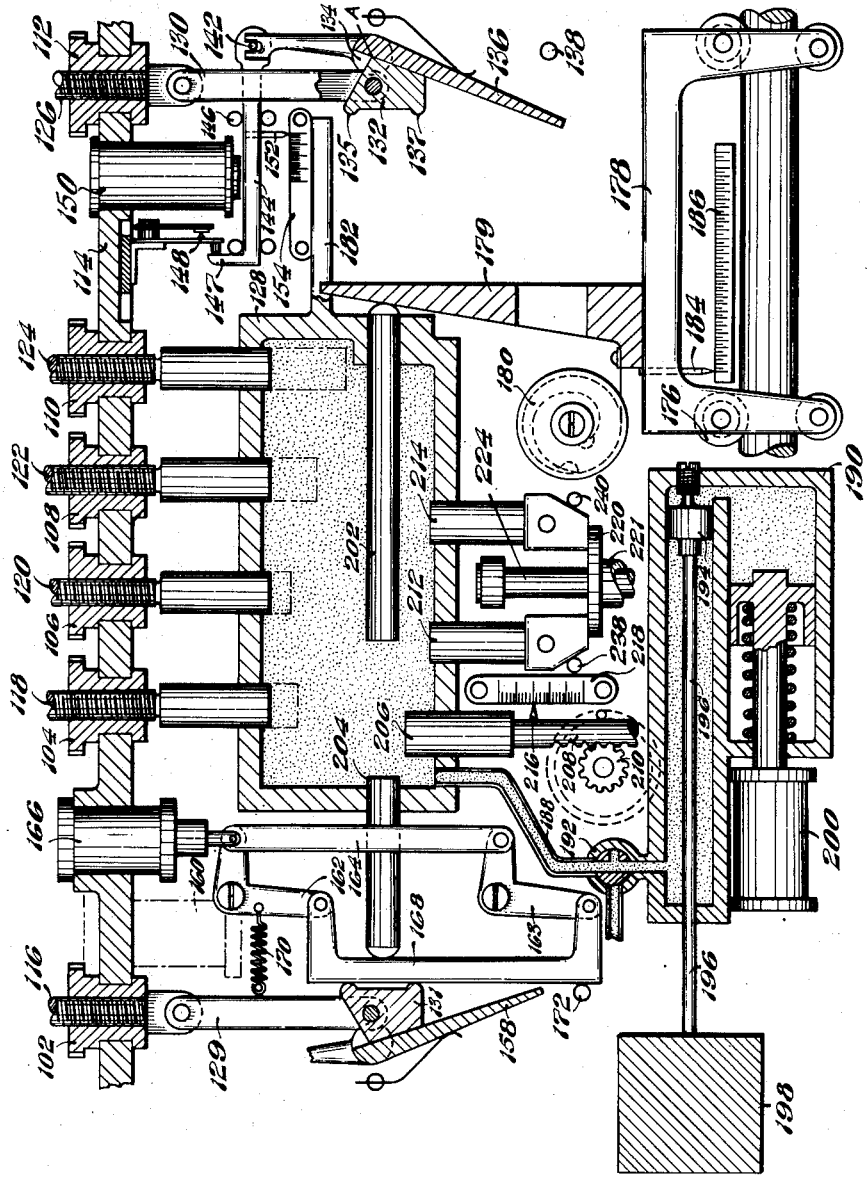
Figure 4:
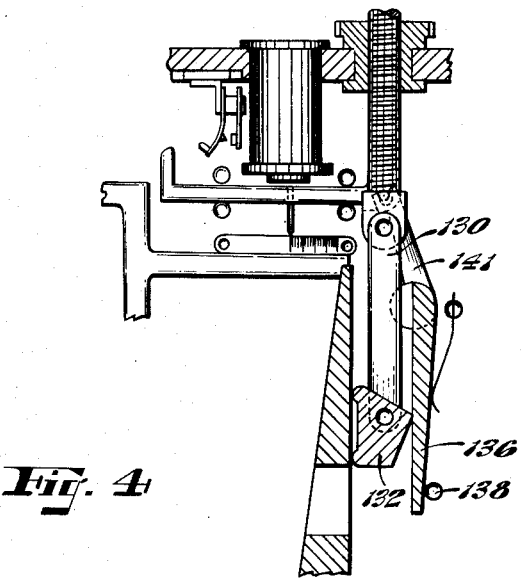
Figure 5:
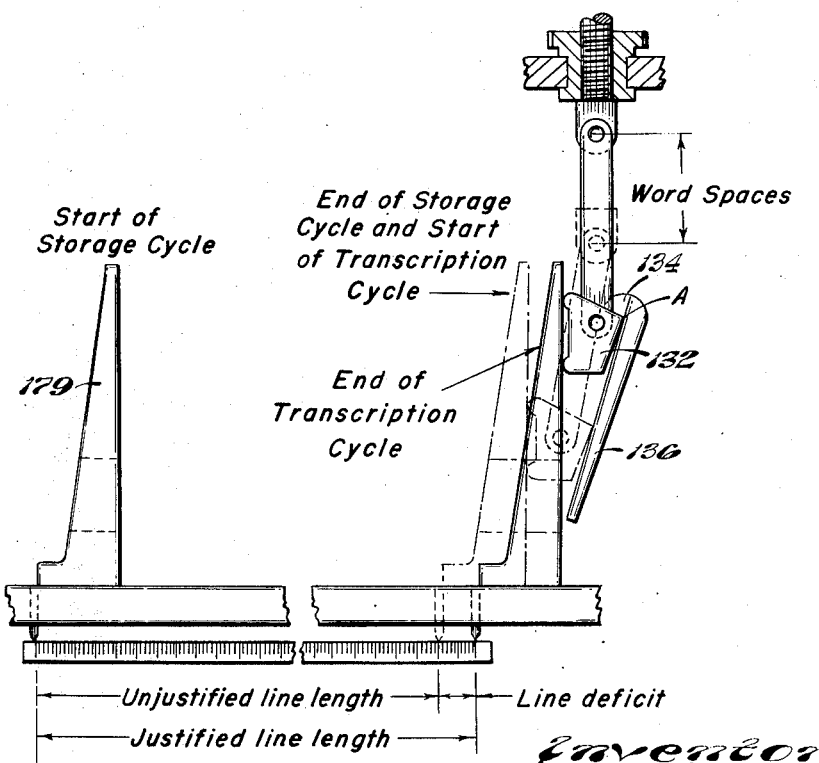
Figure 6:
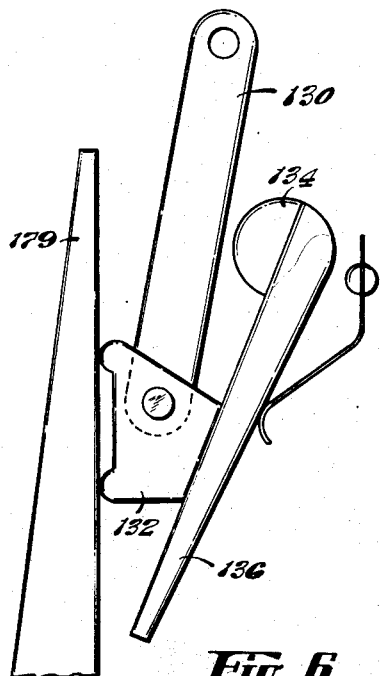
Figure 7:
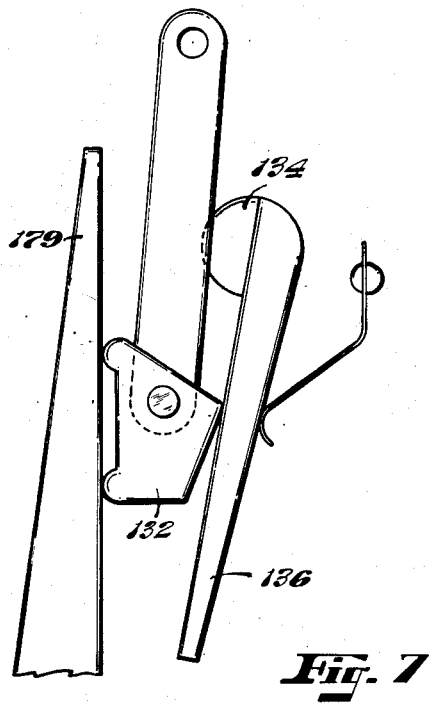
Figure 8:
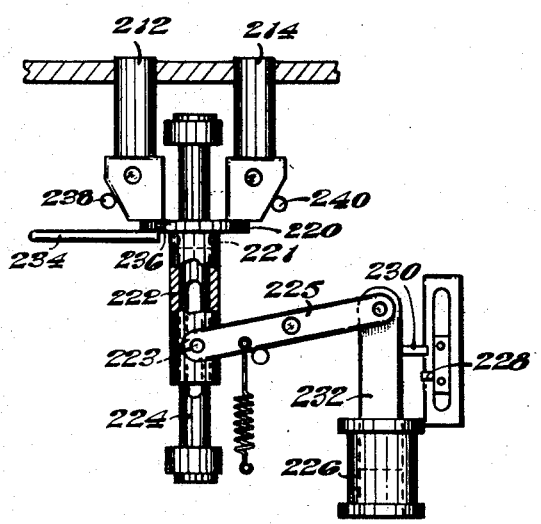
Figure 9:
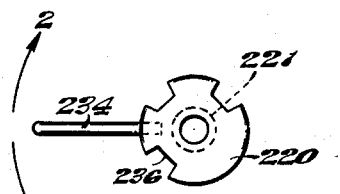
Figure 10:
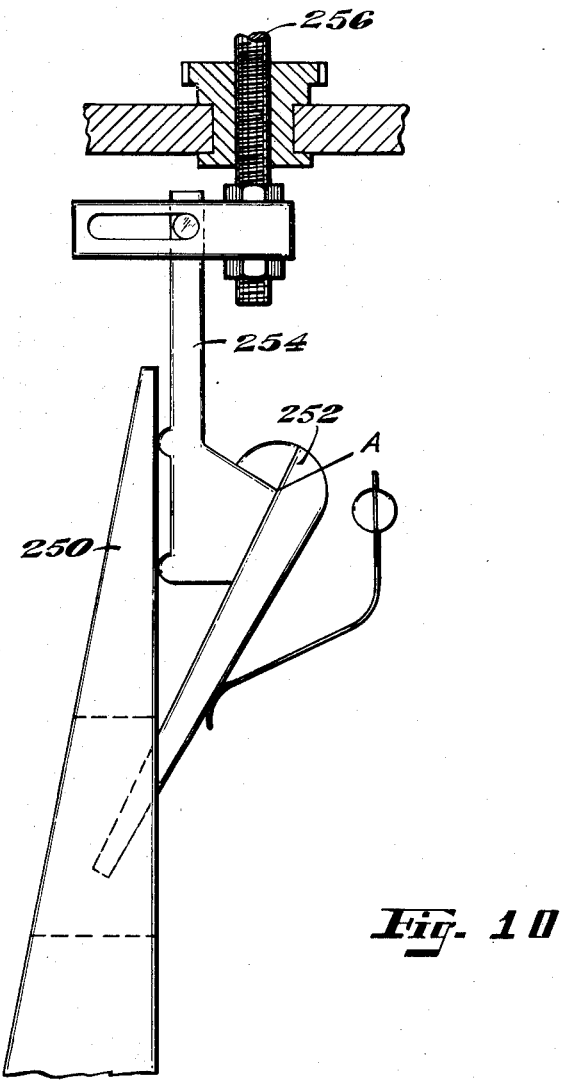

In the accompanying drawings, Fig. 1 is a sectional view of one embodiment of the invention; Fig. 2 is a schematic view of apparatus for moving the storage pistons; Fig. 3 is a sectional view of a second embodiment of the invention; Fig. 4 is a view of a part of the embodiment of Fig. 3 in position for zero interword justification increments; Fig. 5 is a view of a part of the embodiment of Fig. 3 in three transitional positions; Fig. 6 is a view of a part of the embodiment of Fig. 3 at an instant near the end of the storage cycle; Fig. 7 is a view of a part of the embodiment of Fig. 3 at the end of the storage cycle; Fig. 8 is a view of the mechanism driving the spacing pistons 212 and 214, shown also in Fig. 3; Fig. 9 is a view of the flange 220, shown also in Fig. 8; and Fig. 10 is a view of an alternative dividing mechanism.

In Fig. 1 a storage chamber 2 is shown connected by a fluid duct 4 to a character displacement unit 6. The storage chamber is provided with a set of storage pistons 8, 10, 12, and 14, each adapted to move in or out of the chamber, a set of increment pistons 16, equal in number to the maximum number of interwords per line, and likewise adapted to move in or out of the chamber, and a compensating piston 18, fitted into a cylindrical portion 20 of the chamber, and spring-loaded. Screw 22 projects into the chamber and may be adjusted to change the volume capacity of the chamber. As hereinafter described, the purpose of this screw is to change the justified line length.

Each storage piston is driven by a mechanism of the type shown in Fig. 2 by way of example. To cause the piston to advance into the chamber, a magnet 24 is energized to cause an arm 26 to rock counterclockwise and to lock by a pawl 28 into the teeth of a ratchet on the upper surface of a rack 30. Magnet 24 is then deenergized and arm 26 rocks back until stopped by a movable stop member 32. A pinion 34, being keyed to the piston 8 and meshed with the rack, then turns the piston 8, which, being threaded in a sleeve 36, is advanced into the chamber. A magnet 38 performs an identical function in causing the piston to be moved out of the chamber. Appropriate means are provided to disengage the rack not in use from the corresponding driving pinion to permit the other rack and pinion to function as described. As shown in Fig. 1, the storage pistons have different diameters such that their respective cross-sectional areas vary as the integral powers of two.

Above the increment pistons 16 and somewhat separated therefrom is a presser 40, slidably mounted in a guide 42 of storage chamber 2, and pushed by a threaded screw 44. Screw 44 is threaded to a projection of storage chamber 2, and is provided at its end with a bearing to support presser 40, thereby keeping it in a horizontal position and also allowing the screw to rotate in the presser. A gear 46 and a pinion 48, provided with a crank, are mounted to turn the screw.

A word space arm 50, slidably mounted between a fixed stop 52 and a spring 54 is driven from the position shown to an extreme position indicated in dotted lines at 56 by a mechanism of the type shown in Fig. 2.

Fluid duct 4 leads through a three-way valve shown in a position 58 opening a duct 60 and closing duct 4. In a position 62 the valve closes both ducts. In a position 64 it opens duct 4 and closes duct 60.

Ducts 4 and 60 lead to a character displacement cylinder 66, which is a part of character displacement unit 6, and which is provided with a piston 68 and a pushrod 70. Pushrod 70 is attached to and moves a character displacement mechanism 72, which may be a film carriage of the type described in the application of Higonnet and Moyroud, Serial No. 610,336, filed August 11, 1945. A screw stop 74 determines the extreme position of the pushrod 70 corresponding to a margin of the page or column. A driving piston 76 in a cylinder communicating with the character displacement cylinder at one end thereof drives piston 68 by the action of a spring 78. A magnet 80, when energized, pulls piston 76 back against spring 78.

The fluid 82 may be any suitable relatively non-compressible fluid, and is preferably oil.

The operation of the justifier is conveniently divided into two cycles. During the first, or storage cycle, the operator successively depresses the selected keys of the keyboard, thereby operating a set of permutation bars of a type commonly employed in the telegraphic art. These bars perform two functions. The first function, with which the present invention is not concerned, is to actuate the storage unit or register, which may be of the type shown in the application of Higonnet and Moyroud, Serial No. 610,336 mentioned above. The second function is to energize a set of wires 83 according to the binary representations of the widths of the selected characters. These wires connect with magnets, such as magnet 24 in Fig. 2 and cause cumulative volume displacements in the chamber which are proportional to the widths of the selected characters. Stop 32 in Fig. 2 provides means for proportionate variations in all of the piston movements to reflect changes in the point set.

When the space bar is depressed, the combination of wires 83 representing the minimum interword is energized, and in addition one of the wires 85 is energized to cause word space arm 50 to advance over one of the increment pistons 16.

During the second or transcription cycle, the reading unit in the register reads the composed characters successively and provides successive impulses to the sets of wires 85 and 87, which connect to magnets such as magnet 38 and cause the retraction of the word-space arm and storage pistons. As it will be presently shown, the word-space arm and storage pistons will thus have been returned to their original positions at the end of the transcription cycle. During this cycle the fluid movements caused by the movements of the storage and increment pistons produce the desired motion of the character displacement unit 72.

By connections with which the present invention is not concerned, the reading unit of the register also provides impulses to a projection unit of the type described in the application of Higonnet and Moyroud Serial No. 610,336, above mentioned. The successive movements of character displacement unit 72 are timed to occur alternately with the successive character projections.

It will be evident that the binary coding system here disclosed is not essential to the invention, and could be replaced by any suitable system, including, for instance, a single piston in place of the four shown in Fig. 1, the cylinder moving a variable distance inward for each stored character, depending upon its width. It has been found that the system of four pistons shown in Fig. 1, which provides for fifteen different character widths, is large enough in practice. Also, as a concomitant of the use of a binary code, the mechanism chosen to drive the storage pistons may be designed to produce equal linear advancements in each of the storage pistons used to store a character width, regardless of the size of the character width. Thus, to store a character of eleven units width, storage pistons 14, 10 and 8 are each advanced by an identical distance into the chamber.

At the beginning of the storage cycle, piston 68 is against screw stop 74 and spring 78 is compressed by the force of the fluid between pistons 68 and 76. Magnet 80 is not energized. The three-way valve is in position 62 and the fluid exactly fills character displacement cylinder 66 between piston 68 and the three-way valve. Compensating piston 18 is moved from its extreme uppermost position, into the storage chamber so that it displaces a fluid volume equal to a constant K, times the length of the justified line, designated by the constant J. The storage pistons and increment pistons are in position as shown in Fig. 1. Word space arm 50 and presser 40 are also in position as shown. Storage chamber 2 is completely filled with fluid.

As each character is stored, the storage pistons cause a fluid displacement equal to K times the character width. Compensating piston 18 is thus caused to displace an equal volume. As each word space is stored, storage pistons representing the minimum word space, for instance, four units, displace a volume of fluid equal to 4K; and in addition word space arm 50 is moved over an additional increment piston 16.

The storage process is ended by the operator at the end of a word or at a convenient place for hyphenation when compensating piston 18 is in a position near its upper limit, such as is indicated at 84. At this time word space arm 50 has advanced over a number of increment pistons 16 equal to the number of word spaces in the line, and will be, for instance, in a position 86 if there are seven interwords.

The operator then turns pinion 48, thus driving presser 40 down against word space arm 50, and advancing the covered increment pistons some distance $x$ such that the volume of fluid displaced thereby will cause compensating piston 18 to move through the distance $d$, reaching its uppermost position. The presser is then locked in position and the justifier is in position to begin the transcription cycle.

The transcription cycle begins with the moving of the three-way valve into position 64, thus allowing a fluid communication between storage chamber 2 and character displacement unit 6. Piston 76 produces greater force than piston 18; hence, by transmitting motion to piston 68, it will increase the quantity of fluid in storage chamber 2 if the capacity of the chamber should be increased.

During this cycle, as each stored character is transcribed or projected the storage pistons 8, 10, 12 and 14 are withdrawn from storage chamber 2 to increase the fluid capacity by a volume equal to K times the character width. The increased fluid capacity in the chamber allows movement of pistons 68 and 76. The volume displaced by each piston, and in particular piston 68, is thus also equal to the proportionality factor K times the width of the character. The area of piston 68 is made equal to K, so that the distance travelled by pushrod 70 is equal to the width of the character.

When the above process reaches a word space the movement of the storage pistons corresponding to the minimum word space is accompanied by a withdrawal of word space arm 50 from one of the increment pistons 16. This piston releases a volume representing one justification increment, and causes an additional movement of piston 68 and pushrod 70.

It is thus evident that the total movement thus imparted to pushrod 70 during the transcription cycle must equal justified line length J.

At the end of the transcription cycle, pushrod 70 is returned to its original position with piston 68 against screw stop 74 by the energization of magnet 80. This allows compensating piston 18 to return to its original position. The three-way valve is then moved to position 62. All components are then in position to begin a new storage cycle.

It will be evident from the foregoing description that the sealing of the storage and increment pistons must be such as to prevent the escape of fluid from the chamber. Accurate machining is usually sufficient to satisfy this requirement, but any suitable packing may be provided, if desired.

A more efficient variant of the invention utilizes character displacement unit 6 alternately for the transcription cycles of two separate storage chambers. Fluid duct 60 leads to a second storage chamber which is exactly identical with chamber 2. During the transcription cycle of chamber 2 the operator may store the characters for the succeeding line, operating upon the second storage chamber in the same manner as described above. Thus, at the end of the transsription cycle of chamber 2, if the three-way valve is moved to position 58 instead of 62, the character displacement unit may immediately commence a new transcription cycle, during which storage chamber 2 may operate in a storage cycle.

The screw 22, heretofore assumed stationary, is used to insure that the storage cycle begins with the storage chamber exactly filled with fluid, when the compensating piston is in a position corresponding to the justification length J. It may thus be adjusted to change the justification length.

It will be evident from the foregoing description that the present invention utilizes a principle whereby certain inaccuracies in the movements of the functional components are automatically compensated for in such a manner that line length is unaffected. For instance, assume that piston 14 is advanced by a certain additional error increment e each time it is advanced by its driving pinion. If this piston advances 5 times in a storage cycle, the excess volume stored will be 40Ke. At the end of the storage cycle, however, the increment pistons 16 will displace the remaining volume necessary to cause a total correct volume displacement in piston 18 of KJ. During the transcription cycle, each time piston 14 is retracted it will displace more than the theoretically correct volume and produce a larger space than desired; but nevertheless, the total displacement of the character displacement unit 72 will be exactly J, the error having been equally divided among the interword increments in the line.

A second embodiment of the invention, which is different in some respects from the embodiment in Fig. 1, is hereinafter described with reference to Fig. 3.

In Fig. 3 a set of pinions 102, 104, 106, 108, 110 and 112 are rotatably mounted in a stationary frame 114. A set of threaded rods 116, 118, 120, 122, 124 and 126 are received into these pinions. The ends of the rods 118, 120, 122 and 124 form storage pistons analogous to those in Fig. 1, which project into a storage chamber 128, fixed to frame 114. The cross-sectional areas of the storage pistons, unlike those in Fig. 1, are equal. The pitches of the threads, however, vary as the integral powers of two. Thus, for a given equal angular turn of each pinion, the advancements of the respective pistons will vary as the integral powers of two. The effect of the piston advancements on volume displacement is here, as in Fig. 1, both a function of character width and point set, the character width determining the combination of pistons to be advanced, and the point set determining the size of the angle by which each of the pinions is turned. Mechanism of the type shown in Fig. 2 may be employed to drive the pinions.

The pinion 102 counts the number of characters in the line during the storage cycle for justification in which a part or all of the line deficit is to be devided between the characters in the justified line. Details of this type of justification are described hereinafter in greater detail. The pinion 112 counts the interwords. In other words, the pinion 112 is rotated through a definite angle whenever the space bar is struck, and the pinion 102 is rotated through a definite angle whenever either a character key or the space bar is struck.

The threaded rods 116 and 126, which are received in the pinions 102 and 112 respectively, are journaled to links 129 and 130, which are in turn journaled to wedge-blocks 131 and 132, respectively. The block 132 is shown in a position, wherein its edge A passes through the axis of rotation of a shaft 134, rotatable in the frame. A spring-loaded rocking lever 136 is secured to the shaft 134 and bears upon the block 132 as shown. A fixed stop pin 138 limits the extreme position of the lever 136 to a position in which its bearing surface is vertical, as shown in Fig. 4. A forked arm 141 is also secured to the shaft 134. The arm 141 cooperates with a pin 142 extending from a sliding bar 144, which is retained by four stop pins 146.

A tail 147 on the bar is adapted to close a pair of contacts 148, which are used to ring a bell or to actuate other means of warning the operator, for reasons which will hereinafter be described. The tail 147 also fixes the slope of the lever 136, which tends to rotate clockwise under the force of its spring, to that slope which brings the right-hand surface of the block 132 into contact with the lever when the feet 135 and 137 of the block 132 are vertically aligned, as shown in Fig. 3. A magnet 150 provides a means of gripping the bar 144 magnetically to hold it in any position within its limits of movement. A pointer 152 fastened to the bar 144 is placed opposite a fixed scale 154.

The block 131, which is identical with the block 132, is shown in a position in which it bears upon a rocking lever 158 identical with the lever 136. The mechanism associated with the lever 158 is shown in part only; that is, the parts corresponding to the arm 141 and the sliding bar 144 are omitted from the drawing. However, these elements are identical with the arm 141 and the bar 144. The gripping magnet shown in dotted lines at 160 corresponds with the magnet 150. Two bell-crank levers 162 and 163, pivoted to the frame, are each attached at one end to a connecting rod 164 which is connected to the movable core of a magnet 166. The bell-crank levers are each connected at the other end to a laterally movable follower bar 168. When the magnet 166 is not energized, a spring 170, attached to the frame 114 and to the lever 162, forces the follower bar 168 against a fixed stop pin 172.

A rail 174 is rigidly fixed in relation to the frame. By means of rollers 176 a carriage 178 is mounted to roll on the rail. A laterally movable follower 179 is rigidly fixed to the carriage 178 and is normally urged to the left by a tension spring 180.

The follower 179 is guided at its upper end between a pair of rails, of which only one, namely rail 182, is shown. A pointer 184, fastened to the carriage 178, is placed opposite a fixed scale 186.

The motions of the follower 179 and related parts during the storage and transcription cycles are described by reference to Figs. 3, 5, 6, and 7. At the start of the storage cycle the follower 179 is in the position shown in Fig. 3 and also in Fig. 5. During the storage cycle it moves to the right by distances corresponding to the widths of the characters and interwords as they are stored. While these movements are taking place the block 132 is being moved by the advancement of the threaded rod 126 at each interword. At the start of the storage cycle the block 132 and the lever 136 are in the positions shown in Fig. 3. The magnet 150 being unenergized, the lever 136 is free to rotate under the force of its spring until stopped by the tail 147. In this position it bears upon the block 132 along a surface of the block. As the interwords are stored, the block 132 moves downward along the surface of the lever 136. The block 132 is rotatable within a fixed angle with respect to the link 130; therefore, each movement of the pinion 112 produces a movement of the block 132, along the lever, which remains stationary, and the lever 136 maintains contact with the block along the original surface of contact.

The respective movements mentioned above continue until the block comes in contact with the follower 179 as shown in Fig. 6. As additional characters are stored and the follower moves further to the right, the lever 136 is rotated until it bears upon the block 132 only along the edge A, as shown in Fig. 7. The elements are in the positions shown in Fig. 7 and as dotted lines in Fig. 5 at the end of the storage cycle. At the end of the transcription cycle, these elements will have reached the positions shown in Fig. 5, through the reversed movements of the pinion 112 as hereinafter described.

Therefore, the follower 179 is a measuring device which accumulates the total number of units in the unjustified line during the storage cycle, and controls the division of the line deficit among the interwords during the transcription cycle, as will hereinafter be explained in further detail.

The motions of the follower bar 168 are in certain respects similar to the motions of the follower 179, and are described hereinafter in connection with the description of the operation of the justifier.

As shown in Fig. 3, the storage chamber 128 is connected by a fluid duct 188 to a character displacement unit 190 similar to unit 6 in Fig. 1. A three-way valve 192 is used similarly to the valve in Fig. 1 for connecting an alternate storage chamber and for connecting and disconnecting the chamber 128 from the character displacement unit. A piston 194, a driving rod 196, a character displacement mechanism 198 and a magnet 200 are similar to corresponding parts in Fig. 1. An interword compensating piston 202 and an inter-character compensating piston 204 are provided in place of the single piston 18 in Fig. 1. They rest against the followers 179 and 168, respectively. Additional pistons projecting into the chamber 128 are a piston 206, corresponding to the screw 22 in Fig. 1, and driven by a rack 208 and a pinion 210; also, a pair of spacing pistons 212 and 214, which have no counterparts in Fig. 1.

A pointer 216 fixed to the piston 206 is placed opposite a fixed scale 218.

The pistons 212 and 214 have shoulders at the external ends which may rest upon a flange 220 which is secured to a short sleeve 221. The mechanism shown in Figs. 8 and 9 provides means for moving the pistons 212 and 214 into the chamber for creating spaces in the line during the transcription cycle. A more detailed description of this mechanism is hereinafter given in connection with the description of the centering of titles and provisions for cut inserts.

At the beginning of the storage cycle the components of the justifier are in the positions shown in Fig. 3. No magnets are energized. The valve 192 is in position to close the duct 188.

It will first be assumed that "interword justification" is desired; that is, justification where the line deficit is divided only among the interwords.

When the operator selects the first character to be stored, the pinions 104, 106, 108 and 110, corresponding to the binary representation of the character width, are caused to turn through angles dependent upon the point set, as defined above. As a result, the storage pistons will displace a volume in the chamber 128 representing the width of the stored character. This causes the piston 202 to displace an equal volume, thereby displacing the follower 179 by a distance proportional to the character width, against the tension of the spring 189. Simultaneously with the turning of the above-mentioned pinions, the pinion 102 is moved through a fixed angle, as mentioned above, thus causing the block 131 to move downwardly along the surface of the follower 168, and turning the lever 158. The fluid pressure is sufficient to keep the piston 204 from moving into the chamber, and the follower 168 remains against the stop pin 172.

When the second and successive characters are selected, the process is identical with that described above. As mentioned above, the advancements of the threaded rod 116 are equal, regardless of the character widths, but they produce no movement in the piston 204.

When the operator ends a word, a space bar is pushed, with the result that the combination of pistons representing the minimum interword space are advanced into chamber 128. The pinion 102 is also turned, as above. In addition, the interword-counting pinion 112 is turned a fixed amount, causing the block 132 to move along the surface of the lever 136.

The process thus described continues until the follower 179 reaches a position such as is shown in Fig. 6, at which point it comes into contact with the block 132. When this happens it begins to exert torque on the lever 136, which in turn moves the sliding bar 144. Additional movement of the follower 179 eventually results in the opening of the contacts 148 at which point the elements will have reached positions as shown in Fig. 7. When these contacts open the operator is warned by a bell or similar signal actuated by the contacts, and stores thereafter only the characters remaining in the word. He then energizes the magnet 150. This marks the end of the storage cycle and fixes the slope of the lever 136, which is not changed until the end of the transcription cycle.

The transcription cycle begins with the movement of the valve 192 to open the duct 188 (as shown in Fig. 3), thus allowing a fluid communication between the storage chamber 128 and the character displacement unit 190. As in the embodiment of Fig. 1, there is no initial movement of fluid through the duct.

During this cycle, as each stored character is transcribed or projected into permanent form, the combination of the rods 118, 120, 122 and 124 corresponding to the character width are withdrawn from the storage chamber 128 to increase the fluid capacity of the chamber. This allows movement of the piston 194 and the rod 196 by a proportional distance to determine the spacing between the successive characters. The turning of the pinions to withdraw the rods for each character or word space is accompanied by the turning of the pinion 102 through a fixed angle by the mechanism of Fig. 2. This causes the block 131 to move toward its initial position along the follower 168, but produces no resultant movement of the piston 204.

When a word space is reached, in addition to the withdrawal of the rods to produce the minimum interword, the pinion 112 is turned through a fixed angle by the mechanism of Fig. 2. This causes the wedge-block 132 to be withdrawn along the surface of the lever 136, and since the lever 136 is fixed, the follower 179 is moved to the right; and this produces a movement of the piston 202, further out of the chamber. The resultant movement of the rod 196 for the word space is thus increased over the minimum interword by a certain distance depending on the slope of the lever 136. It is evident that, after the final movement of the pinion 112 in the transcription of a line, the block 132 will have reached a position with its edge A in the axis of the shaft 134, as shown in Fig. 5. It is also evident that the total volume which is displaced by the piston 202 during the two cycles represents the total volume of liquid moving into the chamber 128 from the character displacement unit 190, and hence, represents the length of a justified line, since all storage rods will have reached their initial positions when the last character in the line is transcribed.

It is evident that the theoretical limitations of the mechanism including the follower 179, the lever 136, the wedge block 132, and related parts, do not permit the incremental increases in volume for each of the interwords during transcription to be exactly equal. This is caused by the fact that successive equal retractions of the threaded rod 126 do not produce successive movements of the block 132 with equal vertical components. This variation may be decreased or eliminated entirely, if this is considered desirable. The variation is decreased by lengthening the link 130, and eliminated entirely by the substitution of mechanism of the type shown in Fig. 10, or a pantographic mechanism, as will be clear to those familiar with the art. In Fig. 10 the follower 250 corresponds with the follower 179 in Fig. 3, the lever 252 with the lever 136, the block 254 with the block 132, and the rod 256 with the rod 126. The above considerations also apply to the mechanism associated with the follower 168, the lever 158, the block 131, and related mechanisms, as will become clear hereinafter where the operation of that mechanism is described.

The justifier is reset to begin a new storage cycle by energization of the magnet 200 which moves the rod 196 to its original position as shown in Fig. 3. The spring 180, by exerting a force on the follower 179, causes the piston 202 also to move to the position shown in Fig. 3.

It will next be assumed that "mixed justification" of a line is desired; that is, justification where part of the line deficit is taken up between the individual characters. The most common use of mixed justification arises when the operator, during the storage cycle, comes to the end of a word or hyphenation point prior to the opening of the contacts 148 and realizes that, should sufficient additional characters be stored to open the contacts 148, the follower 179 would then have to move beyond the limiting position as shown in Fig. 4 before the next end-of-word or hyphenation point would be reached. When this situation arises, the magnet 166 is energized, thus causing the follower 168 to press the piston 204 into the chamber. This movement is transmitted through the fluid to the piston 202, which advances toward the right until the contacts 148 are opened. At this point the magnet 160 is energized and the magnet 166 is deenergized. The advancement of the piston 204 is thus stopped, and the piston 204 is prevented from moving back by the obstruction of the lever 158 which is now made rigid by the energization of the magnet 160 which was heretofore unenergized. Magnet 150 is also energized to make the lever 136 rigid, as heretofore described.

The transcription cycle proceeds as for interword justification except for the movement of the piston 204. During interword justification this piston remains stationary. For mixed justification, however, as each character or word space is transcribed, the turning of the pinion 102 as described above causes the withdrawal of the block 131 along the surface of the lever 158. This in turn causes the piston 204 to withdraw from the chamber toward its original position, and adds incremental spaces between the characters, depending upon the slope of the lever 158.

It is to be noted that the intercharacter increments thus produced will not in general be equal in size to the interword increments. If it is desired, the interword increments may be reduced to zero, to produce the minimum interword and thereby to bring about what is called "intercharacter justification." This only requires that the operator allow the magnet 166 to cause the piston 204 to advance into the chamber until the follower 179 reaches the position shown in Fig. 4, which is beyond the point at which the contacts 148 are opened.

The piston 206 is used to vary the justified line length. Adjustment of this piston at the beginning of the storage cycle determines the initial position of the follower 179, and hence, the stroke of the piston 202.

It is evident from the above that the scale 218 may be calibrated to read the justified line length, that the scale 186 may be calibrated to read the unjustified line length, and that the scale 154 may be calibrated to read either the sizes of interwords or of interword increments.

Short lines are necessary for a variety of purposes, such as for titles or where cuts are to be inserted. This requires additional means to provide the necessary spaces. For these purposes the spacing pistons 212 and 214 are used. As shown in Fig. 8, the pistons 212 and 214 have shoulders which bear upon a flange 220, secured to a short sleeve 221. The sleeve 221 is slidably inserted into an outer sleeve 222, and the two sleeves are slidably mounted on a fixed rod 224. The rod 224 is provided with an elongated slot. The sleeve 222 is also provided with an elongated slot 223, at right angles thereto. A crank 225, pivoted about a fixed axis at its center, is pinned to the sleeve 222 through the two slots. A magnet 226, when energized, provides means for driving the sleeve 222 upward along the shaft 224. The distance moved may be adjusted by a movable detent 228 which cooperates with a pin 230 on a plunger 232.

The flange 220 is shown in another view in Fig. 9. A handle 234 is secured to the flange to provide means for aligning the notches 236 with either or both of the shoulders on the pistons 212 and 214.

First, assume that a space of predetermined length is needed in the line as for a cut insert. The operator begins the storage cycle in such a case by adjusting the movable detent 228 and energizing the magnet 226. Thus, the pistons 212 and 214 are both driven into the chamber by a fixed distance. The balance of the line is then composed as described above.

During the transcription cycle, at the point in the line where the space is desired, the operator releases both pistons by turning the handle 234 in a clockwise direction as shown in Fig. 9, thus bringing the notches 236 into alignment with the shoulders on the pistons, and allowing the pistons to fall against fixed stop pins 238 and 240. The resulting fluid movement creates the desired space in the transcribed line. The sleeve 222 is then returned to the position shown in Fig. 8 by the deenergization of the magnet 226.

In the case of titles, the space is not of predetermined length, but the number of characters is fixed. These characters should be centered in the line. The operator begins the storage cycle in such a case by first storing the characters. The magnet 226 is then energized and the pistons 212 and 214 are driven into the chamber until the follower 179, pushed by the piston 202, reaches the position shown in Fig. 4. (In this case, there will be no interword justification; but it is evident that appropriate adjustment might be made to permit such justification my simply providing that only sufficient fluid be displaced by the pistons 212 and 214 to cause the opening of the contacts 148.)

During the transcription cycle the piston 212 is released first, by moving the handle 234 counterclockwise, as shown in Fig. 9. The characters are then transcribed, as described above. After the characters are transcribed the piston 214 is released by the deenergization of the magnet 226, thus causing the title to be exactly centered in the line.

Having thus described our invention, we claim:

1. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters, comprising a displacement accumulator, means actuated by the keyboard for accumulating successive displacements in the accumulator by amounts corresponding to the widths of the selected characters and interword spaces in the line, means for measuring the further amount of displacement necessary to cause the aggregate of the said displacements to reach a predetermined amount corresponding to the length of a justified line, means actuated by the register for subtracting successive displacements from the accumulator until the total accumulated displacement is reduced by the said predetermined amount, and a character displacement mechanism actuated by the accumulator while the accumulated displacement is being reduced to space the selected characters successively, whereby the resultant line of transcribed characters is justified.

2. In apparatus for composing lines of written matter, the combination of a chamber containing a liquid and having provision for displacing and replacing variable volumes of the liquid, storage means for causing a cumulative volume displacement of the liquid by amounts corresponding to the widths of the selected characters and interword spaces in a line, means for measuring the additional volume displacement of the liquid necessary to cause the aggregate displacement to reach a predetermined amount corresponding to the length of a justified line, means for replacing the liquid by successive volumes until the total replaced volume is made equal to the said predetermined amount, and a character displacement mechanism actuated by the liquid as it is being replaced to space the selected characters successively whereby the resultant line is justified.

3. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising a chamber containing a liquid and having provision for displacing and replacing variable volumes of the liquid, storage means actuated by the keyboard for causing a cumulative volume displacement of the liquid by amounts corresponding to the widths of the selected characters and interword spaces in the line, means for measuring the additional volume displacement of the liquid necessary to cause the aggregate displacement to reach a predetermined amount corresponding to the length of a justified line, means actuated by the register for causing the replacement of the liquid by successive volumes until the total replaced volume is made equal to the said predetermined amount, and a character displacement mechanism actuated by the liquid as it is being replaced to space the selected characters successively, whereby the resultant line of transcribed characters is justified.

4. In apparatus for composing justified lines, the combination of a chamber containing a liquid and having provision for displacing and replacing variable volumes of the liquid, storage means for causing a cumulative volume displacement of the liquid by amounts corresponding to the widths of the selected characters and interword spaces in a line, means for measuring the additional volume displacement of the liquid necessary to cause the aggregate displacement to reach a predetermined amount corresponding to the length of a justified line, a character displacement mechanism for spacing the selected characters in a justified line, means for hydraulically connecting the chamber and the character displacement mechanism, and means for replacing the liquid in the chamber by successive volumes until the total replaced volume is made equal to the said predetermined amount, the character displacement mechanism being hydraulically actuated by the liquid as it is being replaced.

5. In apparatus for composing justified lines, the combination of a chamber containing a liquid and having pistons for displacing and replacing variable volumes of the liquid including storage pistons for causing a cumulative volume displacement of the liquid by amounts corresponding to the widths of the selected characters and interword spaces in a line, a compensating piston to replace the volumes of liquid displaced by the storage pistons and having provision for replacing a predetermined aggregate volume corresponding to the length of a justified line, means for measuring the additional volume displacement of the liquid necessary to cause the compensating piston to replace the said predetermined volume, a character displacement mechanism for spacing the selected characters in a justified line, means hydraulically connecting the storage chamber and character displacement mechanism, and means for replacing the liquid in the chamber by successive amounts until the total replaced volume is made equal to the said predetermined volume, the character displacement mechanism being hydraulically actuated by the liquid as it is being replaced.

6. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters, comprising a displacement accumulator, means actuated by the keyboard for accumulating successive displacements in the accumulator by amounts corresponding to the widths of the selected characters and interword spaces in the line, means for accumulating in the accumulator the further amount of displacement necessary to cause the aggregate of the said displacements to reach a predetermined amount corresponding to the length of a justified line, means actuated by the register for subtracting successive displacements from the accumulator until the total accumulated displacement is reduced by the said predetermined amount, and a character displacement mechanism actuated by the accumulator while the accumulated displacement is being reduced to space the selected characters successively, whereby the resultant line of transcribed characters is justified.

7. In apparatus for composing lines of written matter, the combination of a chamber containing a liquid and having provision for displacing and replacing variable volumes of the liquid, storage means for causing a cumulative volume displacement of the liquid by amounts corresponding to the widths of the selected characters and interword spaces in a line, means for causing an additional volume displacement of the liquid necessary to cause the aggregate displacement to reach a predetermined amount corresponding to the length of a justified line, means for replacing the liquid by successive volumes until the total replaced volume is made equal to the said predetermined amount, and a character displacement mechanism actuated by the liquid as it is being replaced to space the selected characters successively whereby the resultant line is justified.

8. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising a chamber containing a liquid and having provision for displacing and replacing variable volumes of the liquid, storage means actuated by the keyboard for causing a cumulative volume displacement of the liquid by amounts corresponding to the widths of the selected characters and interword spaces in the line, means for causing an additional volume displacement of the liquid necessary to cause the aggregate displacement to reach a predetermined amount corresponding to the length of a justified line, means actuated by the register for causing the replacement of the liquid by successive volumes until the total replaced volume is made equal to the said predetermined amount, and a character displacement mechanism actuated by the liquid as it is being replaced to space the selected characters successively, whereby the resultant line of transcribed characters is justified.

9. In apparatus for justifying lines of written matter, the combination of an interword counter, a displacement accumulator, displacing means for causing cumulative additions and subtractions of incremental displacements in the accumulator corresponding to the widths of selected characters, justification increments and interword spaces in a line, said means having provision for measuring the difference between the total displacement and a predetermined displacement corresponding to the length of a justified line, means for dividing said difference by the number of said interword spaces, and a character displacement unit responsive to changes in the total displacement during said subtraction for spacing the characters successively.

10. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising an interword counter, a displacement accumulator, displacing means actuated by the keyboard and register for causing cumulative additions and subtractions of incremental displacements in the accumulator corresponding to the widths of the selected characters, justification increments and interword spaces in a line, said displacing means having provision for measuring the difference between the total displacement and a predetermined displacement corresponding to the length of a justified line, means for dividing said difference by the number of said interword spaces, and a character displacement unit responsive to changes in the total displacement during said subtraction for spacing the characters successively.

11. In apparatus for justifying lines of written matter, the combination of a displacement accumulator having provision for cumulative addition and subtraction of displacements, storage means for causing successive cumulative additions of displacements corresponding to the widths of selected characters and minimum interword spaces in a line, means for measuring the difference between the total of said displacements and a predetermined displacement corresponding to the length of a justified line, an interword counter, transcription means for causing successive cumulative subtractions of displacements by amounts equal to said additions of displacements, a character displacement unit responsive to changes in the total displacement during said subtractions for spacing the characters successively, and means controlled by the measuring means and interword counter to increase the interword spaces during transcription.

12. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising a displacement accumulator having provision for cumulative addition and subtraction of displacements, storage means actuated by the keyboard for causing successive cumulative additions of displacements corresponding to the widths of selected characters and minimum interword spaces in a line, means for measuring the difference between the total of said displacements and a predetermined displacement corresponding to the length of a justified line, an interword counter, transcription means actuated by the register for causing successive cumulative subtractions of displacements by amounts equal to said additions of displacements, a character displacement unit responsive to changes in the total displacement during said subtractions for spacing the characters successively, and means controlled by the measuring means and interword counter to increase the interword spaces during transcription.

13. In apparatus for justifying lines of written matter, the combination of a displacement accumulator having provision for cumulative addition and subtraction of displacements, storage means for causing successive cumulative additions to an initial displacement in the accumulator, said additions corresponding to the widths of selected characters and minimum interword spaces in a line, means for measuring the difference between the total of said displacements and a predetermined displacement corresponding to the length of a justified line, an interword counter, means controlled by the measuring means and interword counter for dividing said difference into justification increments equal in number to said interword spaces, transcription means for causing successive cumulative subtractions of displacements by amounts equal to said additions of displacements and to said justification increments, and a character displacement unit responsive to changes in the total displacement during said subtractions for spacing the characters successively.

14. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising a displacement accumulator having provision for cumulative addition and subtraction of displacements, storage means actuated by the keyboard for causing successive cumulative additions to an initial displacement in the accumulator, said additions corresponding to the widths of selected characters and minimum interword spaces in a line, means for measuring the difference between the total of said displacements and a predetermined displacement corresponding to the length of a justified line, an interword counter, means controlled by the measuring means and interword counter for dividing said difference into justification increments equal in number to said interword spaces, transcription means actuated by the register for causing successive cumulative subtractions of displacements by amounts equal to said additions of displacements and to said justification increments, and a character displacement unit responsive to changes in the total displacement during said subtractions for spacing the characters successively.

15. In apparatus for justifying lines of written matter, the combination of a displacement accumulator having provision for cumulative addition and subtraction of displacements, storage means for causing successive cumulative additions of displacements corresponding to the widths of selected characters and minimum interword spaces in a line, line deficit means for causing an additional displacement equal to the difference between the total of said displacements and a predetermined displacement corresponding to the length of a justified line, an interword counter, means controlled by the line deficit means and interword counter for dividing said difference into justification increments equal in number to said interword spaces, transcription means for causing successive cumulative subtractions of displacements by amounts equal to said additions of displacements and to said justification increments, and a character displacement unit responsive to changes in the total displacement during said subtractions for spacing the characters successively.

16. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising a displacement accumulator having provision for cumulative addition and subtraction of displacements, storage means actuated by the keyboard for causing successive cumulative additions of displacements corresponding to the widths of selected characters and minimum interword spaces in a line, line deficit means for causing an additional displacement equal to the difference between the total of said displacements and a predetermined displacement corresponding to the length of a justified line, an interword counter, means controlled by the line deficit means and interword counter for dividing said difference into justification increments equal in number to said interword spaces, transcription means actuated by the register for causing successive cumulative subtractions of displacements by amounts equal to said additions of displacements and to said justification increments, and a character displacement unit responsive to changes in the total displacement during said subtractions for spacing the characters successively.

17. In apparatus for justifying lines of written matter, the combination of an interword counter, a chamber containing a liquid, displacing means for causing cumulative additions and subtractions of incremental volume displacements in the chamber corresponding to the widths of selected characters, justification increments and interword spaces in a line, said means having provision for measuring the difference between the total displacement and a predetermined displacement corresponding to the length of a justified line, means for dividing said difference by the number of said interword spaces, and a character displacement unit responsive to changes in the total displacement during said subtraction for spacing the characters successively.

18. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising an interword counter, a chamber containing a liquid, displacing means actuated by the keyboard and register for causing cumulative additions and subtractions of volume displacements in the chamber corresponding to the widths of the selected characters, justification increments and interword spaces in a line, said displacing means having provision for measuring the difference between the total displacement and a predetermined displacement corresponding to the length of a justified line, means for dividing said difference by the number of said interword spaces, and a character displacement unit responsive to changes in the total displacement during said subtraction for spacing the characters successively.

19. In apparatus for justifying lines of written matter, the combination of a chamber containing a liquid, displacing means for causing cumulative additions and subtractions of volume displacements in the chamber, storage means for causing successive cumulative additions of displacements corresponding to the widths of selected characters and minimum interword spaces in a line, means for measuring the difference between the total of said displacements and a predetermined displacement corresponding to the length of a justified line, an interword counter, transcription means for causing successive cumulative subtractions of displacements by amounts equal to said additions of displacements, a character displacement unit responsive to changes in the total displacement during said subtractions for spacing the characters successively, and means controlled by the measuring means and interword counter to increase the interword spaces during transcription.

20. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising a chamber containing a liquid, displacing means for causing cumulative additions and subtractions of volume displacements in the chamber, storage means actuated by the keyboard for causing successive cumulative additions of displacements corresponding to the widths of selected characters and minimum interword spaces in a line, means for measuring the difference between the total of said displacements and a predetermined displacement corresponding to the length of a justified line, an interword counter, transcription means actuated by the register for causing successive cumulative subtractions of displacements by amounts equal to said additions of displacements, a character displacement unit responsive to changes in the total displacement during said subtractions for spacing the characters successively, and means controlled by the measuring means and interword counter to increase the interword spaces during transcription.

21. In apparatus for justifying lines of written matter, the combination of a chamber containing a liquid, displacing means for causing cumulative additions and subtractions of volume displacements in the chamber, storage means for causing successive cumulative additions to an initial displacement in the chamber, said additions corresponding to the widths of selected characters and minimum interword spaces in a line, means for measuring the difference between the total of said displacements and a predetermined displacement corresponding to the length of a justified line, an interword counter, means controlled by the measuring means and interword counter for dividing said difference into justification increments equal in number to said interword spaces, transcription means for causing successive cumulative subtractions of displacements by amounts equal to said additions of displacements and to said justification increments, and a character displacement unit responsive to changes in the total displacement during said subtractions for spacing the characters successively.

22. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising a chamber containing a liquid, displacing means for causing cumulative additions and subtractions of volume displacements in the chamber, storage means actuated by the keyboard for causing successive cumulative additions to an initial displacement in the chamber, said additions corresponding to the widths of selected characters and minimum interword spaces in a line, means for measuring the difference between the total of said displacements and a predetermined displacement corresponding to the length of a justified line, an interword counter, means controlled by the measuring means and interword counter for dividing said difference into justification increments equal in number to said interword spaces, transcription means actuated by the register for causing successive cumulative subtractions of displacements by amounts equal to said additions of displacements and to said justification increments, and a character displacement unit responsive to changes in the total displacement during said subtractions for spacing the characters successively.

23. In apparatus for justifying lines of written matter, the combination of a chamber containing a liquid, displacing means for causing cumulative additions and subtractions of volume displacements in the chamber, storage means for causing successive cumulative additions of displacements corresponding to the widths of selected characters and minimum interword spaces in a line, line deficit means for causing an additional displacement equal to the difference between the total of said displacements and a predetermined displacement corresponding to the length of a justified line, an interword counter, means controlled by the line deficit means and interword counter for dividing said difference into justification increments equal in number to said interword spaces, transcription means for causing successive cumulative subtractions of displacements by amounts equal to said additions of displacements and to said justification increments, and a character displacement unit responsive to changes in the total displacement during said subtractions for spacing the characters successively.

24. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters comprising a chamber containing a liquid, displacing means for causing cumulative additions and subtractions of volume displacements in the chamber, storage means actuated by the keyboard for causing successive cumulative additions of displacements corresponding to the widths of selected characters and minimum interword spaces in a line, line deficit means for causing an additional displacement equal to the difference between the total of said displacements and a predetermined displacement corresponding to the length of a justified line, an interword counter, means controlled by the line deficit means and interword counter for dividing said difference into justification increments equal in number to said interword spaces, transcription means actuated by the register for causing successive cumulative subtractions of displacements by amounts equal to said additions of displacements and to said justification increments, and a character displacement unit responsive to changes in the total displacement during said subtractions for spacing the characters successively.

25. In apparatus for composing justified lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters, comprising a displacement accumulator consisting of a linearly movable follower and means actuated by the keyboard for accumulating successive displacements of the follower corresponding to the widths of the selected characters and interword spaces in a line, means for measuring the further amount of said displacements necessary to cause the aggregate displacement to reach a predetermined amount corresponding to the length of a justified line, means actuated by the register and said measuring means to cause successive displacements of the accumulator having said predetermined aggregate, and a character displacement mechanism actuated by the accumulator during said successive displacements to space the selected characters successively.

26. In apparatus for composing justified lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters, comprising a displacement accumulator consisting of a linearly movable follower and means actuated by the keyboard for accumulating successive displacements of the follower corresponding to the widths of the selected characters and interword spaces in a line, means for measuring the further amount of said displacements necessary to cause the aggregate displacement to reach a predetermined amount corresponding to the length of a justified line, an interword counter for counting the number of interwords in the line, means actuated by the register, said measuring means and the interword counter to cause successive displacements of the accumulator having said predetermined aggregate, and a character displacement mechanism actuated by the accumulator during said successive displacements to space the selected characters successively.

27. In apparatus for composing lines of written matter, the combination of a displacement accumulator, means for accumulating successive displacements in the accumulator by amounts corresponding to the widths of the selected characters and interword spaces in a line, space recording means for accumulating further displacements by amounts corresponding to blank spaces needed in the line, means for measuring the further amount of displacement necessary to cause the aggregate of the said displacements to reach a predetermined amount corresponding to the length of a justified line, means for subtracting successive displacements from the accumulator until the total subtracted displacement is equal to said predetermined amount, and a character displacement mechanism actuated by the accumulator during the subtraction to space the selected characters successively, whereby the resultant line is justified.

28. Apparatus according to claim 27 in which the space recording means include two displacing elements, means for causing each element to displace one-half of said further amount of displacement necessary to cause the aggregate of the accumulated displacements to reach said predetermined amount, means for causing one element to subtract its displacement before the characters are transcribed, and means for causing the other element to subtract its displacement after the characters are transcribed, whereby the transcribed line is centered.

29. In apparatus for justifying lines of written matter, the combination of a displacement accumulator including a movable element for measuring displacement, storage means to accumulate displacements corresponding to the selected characters and spaces in a line, whereby said element approaches a position corresponding to the justified line, increment means operable after the storage means to move the element to said position including means to produce displacements for the justification increments corresponding to said movement, spacing means operable by displacements of the accumulator to space the characters, and means to repeat the displacements of the storage means in reverse and to cause the increment means to produce displacements for the justification increments.

30. In apparatus for composing lines of written matter, the combination of a displacement accumulator, a number of space accumulator elements adapted for selection in combinations corresponding to the width of each character and space in a line to cause successive displacements in the accumulator, means for measuring the further amount of displacement necessary to cause the aggregate of the said displacements to reach a predetermined amount corresponding to the length of a justified line, means for subtracting successive displacements from the accumulator until the total accumulated displacement is reduced by the said predetermined amount, and a character displacement mechanism actuated by the accumulator while the accumulated displacement is being reduced to space the selected characters successively, whereby the resultant line is justified.

31. In apparatus for composing lines of written matter, the combination of a displacement accumulator, line length storing means adapted to add into the accumulator successive displacements corresponding to the widths of the selected characters and interword spaces in a line, means for measuring the further amount of displacement necessary to cause the aggregate to reach a predetermined amount corresponding to the length of a justified line, means for subtracting displacements from the accumulator equal to said successive displacements, means for subtracting additional equal displacements from the accumulator equal in the aggregate to said further amount, and a character displacement mechanism actuated by the accumulator during the subtractions of displacements to space the characters successively, whereby the resultant line is justified.

32. In apparatus for composing lines of written matter, the combination of a displacement accumulator, line length storing means adapted to add into the accumulator successive displacements corresponding to the widths of the selected characters and interword spaces in a line, means for measuring the further amount of displacement necessary to cause the aggregate to reach a predetermined amount corresponding to the length of a justified line, means for subtracting displacements from the accumulator equal to said successive displacements and additional displacements selectively interposed therebetween and having an aggregate value equal to said further amount, and a character displacement mechanism actuated by the accumulator during the subtractions of displacements to space the characters successively, whereby the resultant line is justified.

References Cited in the file of this patent

UNITED STATES PATENTS

| | | |
|---|---|---|
| 2,322,222 | Colton | June 22, 1943 |
| 2,379,862 | Bush | July 10, 1945 |
| 2,395,659 | Freund et al. | Feb. 26, 1946 |